United States Patent
Bryant et al.

(10) Patent No.: US 6,748,106 B1
(45) Date of Patent: Jun. 8, 2004

(54) METHOD FOR REPRESENTING AN EXTENDED COLOR GAMUT DIGITAL IMAGE ON A HARD-COPY OUTPUT MEDIUM

(75) Inventors: Robert C. Bryant, Honeoye Falls, NY (US); Kevin E. Spaulding, Spencerport, NY (US); Drew D. Summers, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/537,064

(22) Filed: Mar. 28, 2000

(51) Int. Cl.$^7$ ............................. G06K 9/00; G03F 3/10
(52) U.S. Cl. ..................... 382/162; 382/165; 358/1.9; 358/3.28
(58) Field of Search ................ 382/162, 240, 382/141, 165, 232, 245; 358/1.9, 527, 500, 504, 515, 520, 518, 3.28; 380/54; 348/463; 430/120

(56) References Cited

U.S. PATENT DOCUMENTS

| | | | |
|---|---|---|---|
| 3,969,830 A | * 7/1976 | Grasham | 380/54 |
| 5,134,573 A | * 7/1992 | Goodwin | 382/141 |
| 5,229,259 A | 7/1993 | Yokota | |
| 5,514,860 A | 5/1996 | Berson | |
| 5,542,971 A | 8/1996 | Auslander et al. | |
| 5,652,626 A | * 7/1997 | Kawakami et al. | 348/463 |
| 5,841,885 A | 11/1998 | Neff et al. | |
| 5,859,920 A | 1/1999 | Daly et al. | |
| 5,935,755 A | * 8/1999 | Kazmaier et al. | 430/120 |
| 5,949,967 A | * 9/1999 | Spaulding et al. | 358/1.9 |
| 5,956,467 A | * 9/1999 | Rabbani et al. | 358/1.9 |
| 6,282,311 B1 | * 8/2001 | McCarthy et al. | 382/162 |
| 6,282,312 B1 | * 8/2001 | McCarthy et al. | 382/162 |
| 6,282,313 B1 | * 8/2001 | McCarthy et al. | 382/162 |
| 6,285,784 B1 | * 9/2001 | Spaulding et al. | 382/162 |
| 6,301,393 B1 | * 10/2001 | Spaulding et al. | 382/240 |
| 6,304,345 B1 | * 10/2001 | Patton et al. | 358/527 |
| 6,335,983 B1 | * 1/2002 | McCarthy et al. | 382/162 |
| 6,591,009 B1 | * 7/2003 | Usami et al. | 382/165 |

OTHER PUBLICATIONS

Pewzner, Eliahu; Zucker Moshe; Personal Identification Instrucment and Method Therefor; Aug. 14, 2003; USPTO; US 2003/0152250 A1.*

* cited by examiner

*Primary Examiner*—Edward Coles
*Assistant Examiner*—Timothy J. Stephany
(74) *Attorney, Agent, or Firm*—Raymond L. Owens (57) ABSTRACT

A method for representing an extended color gamut digital image on a hard-copy output medium having a limited color gamut comprising the steps of adjusting the color values of the extended color gamut digital image to fit within the limited color gamut of the output medium to form a limited color gamut digital image, producing a limited color gamut output print from the limited color gamut digital image on the hard-copy output medium, determining a residual image representing a difference between the extended color gamut digital image and the limited color gamut digital image, and encoding the residual image on the output print using a digital encoding means such that the residual image and the limited color gamut output print are adapted to be used to form a reconstructed extended color gamut digital image.

45 Claims, 4 Drawing Sheets

METHOD FOR REPRESENTING AN EXTENDED COLOR GAMUT DIGITAL IMAGE ON A HARD-COPY OUTPUT MEDIUM

CROSS REFERENCE TO RELATED APPLICATIONS

Reference is made to commonly assigned U.S. patent application Ser. Nos. 09/162,205 filed Sep. 28, 1998; 09/162,051 filed Sep. 28, 1998; 09/162,026 filed Sep. 28, 1998; 09/162,234 filed Sep. 28, 1998; 09/162,201 filed Sep. 28, 1998; 09/354,808 filed Jul. 16, 1999; and 09/489,367 filed Jan. 21, 2000; the disclosures of which are incorporated herein by reference.

FIELD OF THE INVENTION

The present invention relates to the field of digital imaging, and more particularly to representing an extended color gamut digital image with a hard-copy output medium having a limited color gamut.

BACKGROUND OF THE INVENTION

In digital imaging systems, it is frequently desirable to produce hard-copy prints of a digital image. Such hard-copy prints will be limited to the range of colors and tones that can be produced on the particular device and output medium used to produce the image. This range of colors and tones that can be produced on the particular device and output medium is commonly referred to as the color gamut. In many cases, the range of colors that may be present in an original digital image may be significantly larger than the color gamut of the hard-copy print. As a result, information must be discarded in the process of producing the hard-copy print. For example, if the image contains a highly saturated blue sky that is more colorful than any blue that can be produced on the hard-copy print, the color of the blue sky must be clipped to fit within the color gamut of the hard-copy print. Likewise, an original image may also contain a luminance dynamic range (range of brightnesses) that is larger than that which can be produced on the hard-copy print. Therefore, the brightness values in the original image would need to be clipped, or otherwise compressed, to fit within the luminance dynamic range of the hard-copy print.

One example of particular importance is for images which originate on photographic negatives. This image capture means is capable of capturing a particularly large luminance dynamic range and color gamut. Some color negative systems can capture a scene luminance dynamic range of 8,000:1 or more. Typical hard-copy prints made from photographic negatives can only retain the information from a scene luminance dynamic range of about 100:1 or less. As a result, a large amount of information must be discarded in the process of producing the hard-copy print.

For example, consider the case where a photograph is taken of a person in a dimly lit room sitting in front of brightly lit window. The photographic negative has sufficient luminance dynamic range to record both the indoor part of the scene and the outdoor part of the scene. However, when a hard-copy print is produced, it is necessary to select which portion of the luminance dynamic range should be printed. A print can be made where the indoor part of the scene is well exposed, or alternatively, a print can be made where the outdoor part of the scene is well exposed. When photographic prints are produced, an automatic algorithm is typically used to guess at which part of the scene is most important and to adjust the exposure accordingly. However, many times the algorithm may guess incorrectly. In this case, the only recourse is to have another print made from the original photographic negative where the printing parameters are adjusted appropriately to properly expose the important parts of the scene.

However, a problem with this approach is that the original photographic negatives may be discarded or lost, or may be very difficult to find. As a result, it is not always possible to retrieve the extended color gamut information from the negative. In this case, it is generally not possible to make a significantly improved image from the hard-copy print alone since it does not retain any of the extended color gamut information beyond that which can be produced on the hard-copy print.

Figure 1:
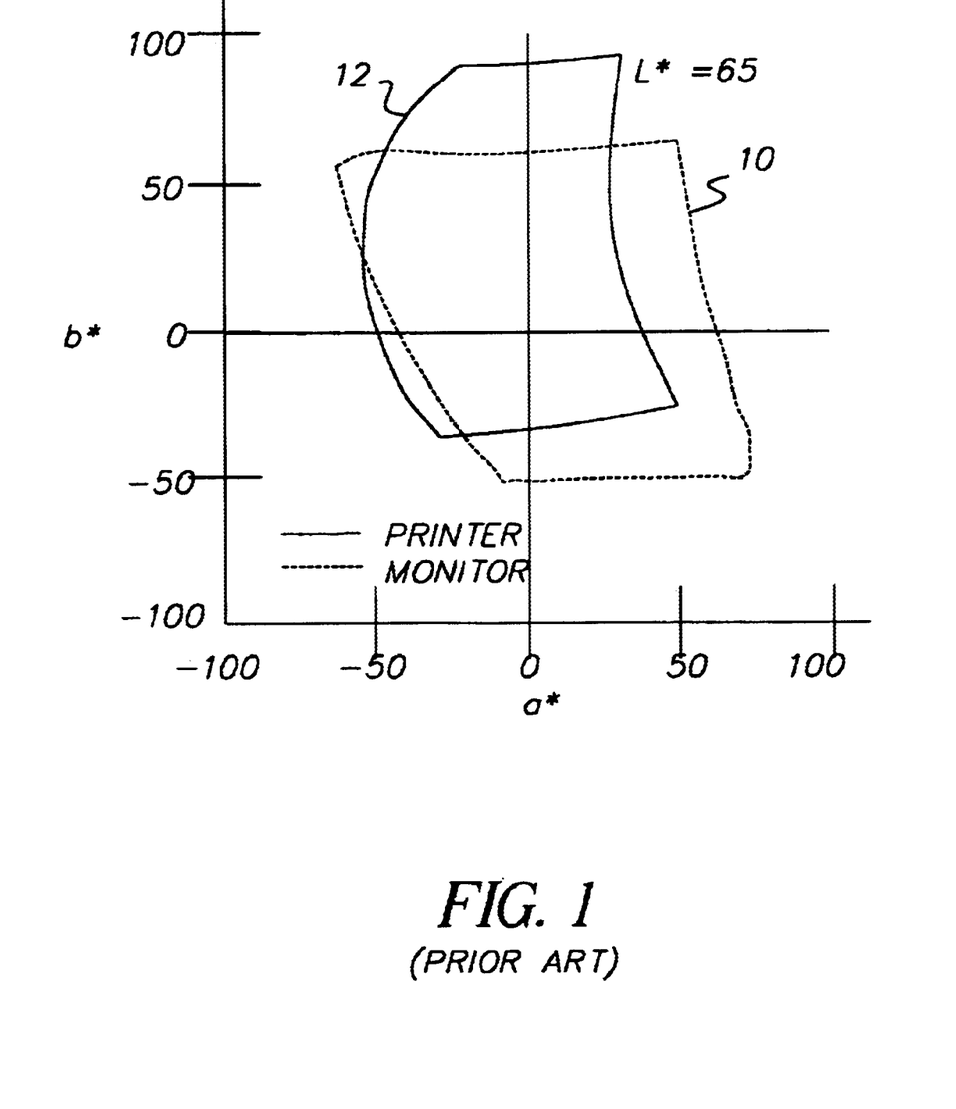
FIG. 1 is graph comparing the color gamuts of a typical video display, and a typical reflection print.

Another case where the limited color gamut of a hard-copy print can cause serious restrictions is for hard-copy images produced from digital images that are stored in a color space other than a color space specifically associated with the hard-copy output device. For example, many digital images may by stored in, or may originate in, a video RGB color space. FIG. 1 shows a comparison of a typical video RGB color gamut 10 and a typical hard-copy print color gamut 12. In this case, a*-b* cross-sections of the color gamuts are shown in the CIELAB space at an L* of 65. The colors that are inside the boundary are within the gamuts of the respective devices, while those that are outside the boundary cannot be reproduced, and are therefore referred to as "out-of-gamut" colors. It can be seen that there is a large set of color values that are within the video RGB color gamut 10, but are outside the hard-copy print color gamut 12. As a result, if an image in the video RGB color space was used to make a hard-copy print, it would not be possible to encode this color information. Therefore, if it were desired at a later time to make a hard-copy print on a different hard-copy output device that had a larger color gamut, it would be impossible to recover the information about the colors that were outside the color gamut of the first hard-copy print.

U.S. Pat. No. 5,841,885 to Neff et al. has disclosed a system and method of storing a digital record which is representative of an image on the print. This approach could be used to store a record of an extended color gamut representation of the image to address the present need. However, a serious shortcoming of the method of U.S. Pat. No. 5,841,885 is that a relatively large amount of information would need to be recorded on the print, thereby making this solution impractical in many cases for storing a full-resolution extended color gamut image.

SUMMARY OF THE INVENTION

It is an object of the present invention to overcome the limitations of the prior ail by permitting the retention of extended color gamut information using a hard-copy output medium having a limited color gamut.

This object is achieved in a method for representing an extended color gamut digital image on a hard-copy output medium having a limited color gamut comprising the steps of:

a) adjusting the color values of the extended color gamut digital image to fit within the limited color gamut of the output medium to form a limited color gamut digital image;

b) producing a limited color gamut output print from the limited color gamut digital image on the hard-copy output medium;

c) determining a residual image representing a difference between the extended color gamut digital image and the limited color gamut digital image; and d) encoding the residual image on the output print using a digital encoding means such that the residual image and the limited color gamut output print are adapted to be used to form a reconstructed extended color gamut digital image.

ADVANTAGES

The present invention has the advantage that the extended color gamut information associated with an original extended color gamut image can be retained on a hard-copy output print having a limited color gamut. This makes it possible to obtain the benefits associated with the original extended color gamut image source without requiring that it be archived separately.

The present invention has the additional advantage that the amount of digital data that must be recorded is substantially smaller than would be required to the entire extended color gamut digital image.

The present invention has the additional advantage that the extended color gamut information can be used, together with the original limited color gamut output print, to produce a reconstructed extended color-gamut digital image that can be used to produce improved output prints.

The present invention has the additional advantage that the extended color gamut information can be used, together with the original limited color gamut output print, to produce an improved image on an output device with a color gamut different than that of the original limited color gamut output print.

DETAILED DESCRIPTION OF THE INVENTION

Figure 2:
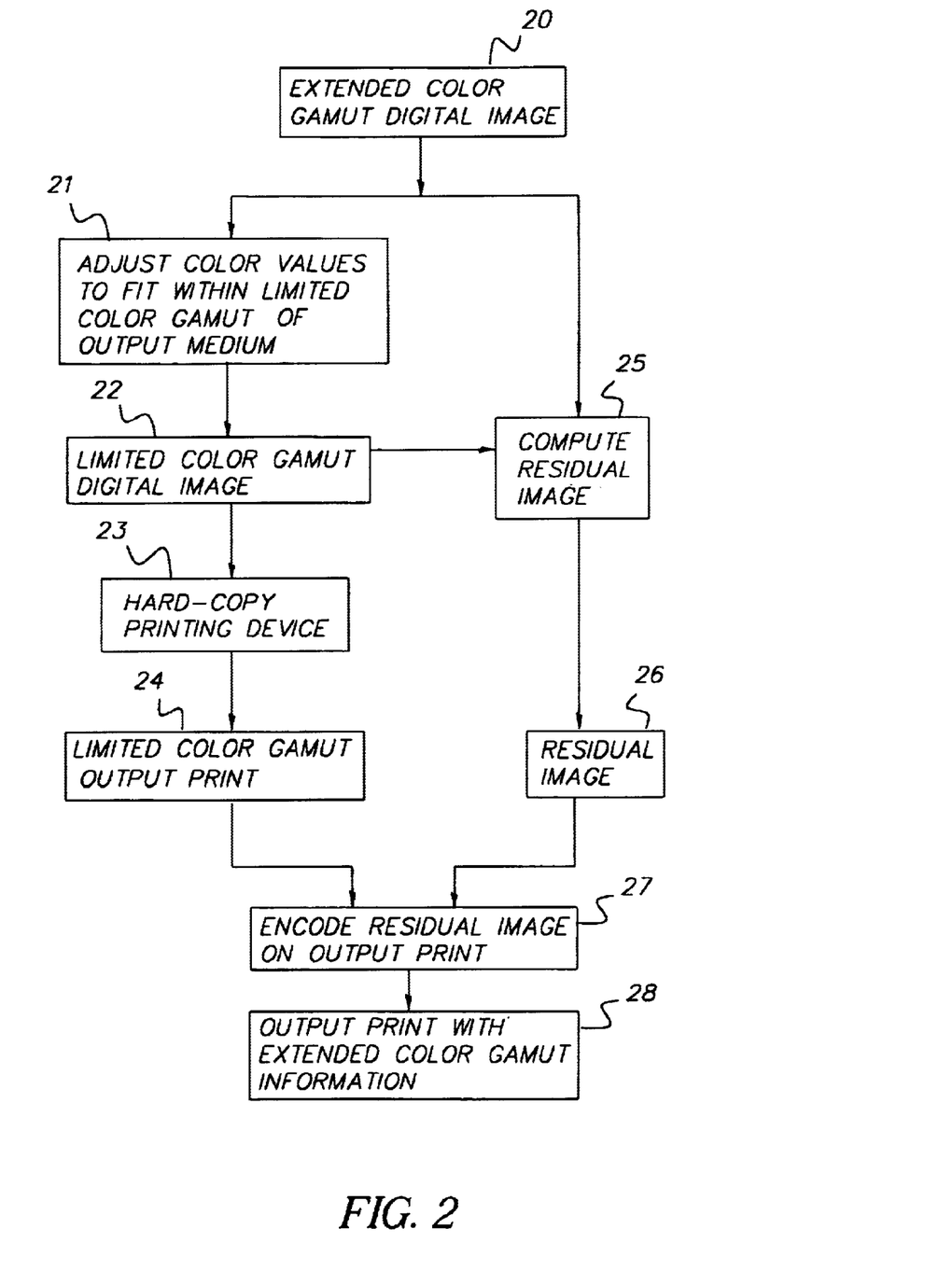
FIG. 2 is a flowchart showing a process for making an output print with extended color gamut information in accordance with the present invention.

One preferred embodiment of the present invention is shown in FIG. 2. An extended color gamut digital image 20 has color values that are outside the limited color gamut of a particular output medium. An adjust color values step 21 is used to limit the color values to those that will fit within the limited color gamut of the particular output medium to form a limited color gamut digital image 22. Next, the limited color gamut digital image is input to a hard-copy printing device 23 to produce a limited color gamut output print 24. A compute residual image step 25 is used to determine a residual image 26 representing the difference between the extended color gamut digital image and the limited color gamut digital image. The residual image 26 is then encoded on the limited color gamut output print 24 using an encode residual image on output print step 27 to produce an output print with extended color gamut information 28.

Each of the aspects of the invention shown in FIG. 2 will now be discussed in more detail. The extended color gamut digital image 20 can take many different forms. For example, the image can be a scanned photographic print, a scanned photographic negative, a scanned photographic transparency, an image from a digital camera, or a computer generated image, etc. Depending on the source of the image, as well as any image processing steps that have been applied to the image, the image may have very different color gamuts and color representations. In particular, images from scanned photographic negatives and digital cameras can contain scene information having a much larger luminance dynamic range than can be represented on many output devices. In this case, luminance dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as three-dimensional volumes. Color values that are within the volume are said to be "in-gamut," whereas color values that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The extended color gamut digital image will generally have a larger luminance dynamic range and a larger range of chroma values than the limited color gamut digital image. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta, and yellow).

If the extended color gamut digital image 20 were a scanned photographic print, the color gamut of the image would generally be the color gamut of the original photographic print medium. Likewise, if the extended color gamut digital image 20 were captured by a digital camera, the color gamut of the image would generally be that of an original scene, although it may be limited by the dynamic range of the camera sensor and by lens flare. The color space that the image is represented in is somewhat independent of the color gamut of the original image. For example, the color values for a scanned photographic print can be represented as raw scanner code values, or they can be given by device independent color values according to a color space such as the CIELAB color space. Alternatively, the color values can be expressed in some other color space.

The adjust color values step 21 is used to adjust the color values of the extended color gamut digital image to fit within the limited color gamut of the output medium, forming a limited color gamut digital image 22. In a preferred embodiment of the present invention, the hard-copy output medium is a silver halide photographic print output medium. The limited color gamut in this case will correspond to the set of colors that can be produced on the photographic print. In this step, information must be discarded when color values that are outside the limited color gamut are mapped to color values within the limited color gamut. In some cases, the color values for the out-of-gamut colors are simply "clipped," i.e., they are mapped to color values on the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut may also have a larger luminance dynamic range than can be represented in the limited color gamut. In the case where it is necessary to reduce the luminance dynamic range of the image, one part in the implementation of the adjust color values step 21 is typically the application of a tone scale function. The tone scale function might be applied to a luminance channel of the image, or alternatively to each color channel of an RGB color representation. In some applications, the image being processed may actually be a monochrome image, e.g., a black-and-white image. In this case, the tonescale function would be applied to the image luminance values.

For cases where the extended color gamut digital image is a representation of the colors in an original scene, the adjust color values step 21 will typically involve determining aim reproduced color values that will produce a desirable reproduction on the particular hard-copy output medium. The process of transforming the original scene color values into aim reproduced color values is sometimes referred to as "rendering" the image.

Once the limited color gamut digital image 22 has been determined, the next step is to print the limited color gamut digital using a hard-copy printing device 23 to produce a limited color gamut output print 24. It may be necessary to use some sort of color calibration or color management technique to determine the appropriate control signal values for the hard-copy printing device 23 corresponding to the code values of the limited color gamut digital image 22.

A compute residual image step 25 is used to determine a residual image 26 representing the difference between the extended color gamut digital image 20 and the limited color gamut digital image 22. In its simplest form, the residual image can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image. For example, it might be desirable to compute the residual image in a color space that is well-suited for compressing the residual image or that is convenient for use in reconstructing the extended color gamut digital image. Generally, the extended color gamut digital image 20 and the limited color gamut digital image 22 should be represented in the same color space before the residual image is calculated so that the in-gamut colors will be given by zero residual errors. Since most images will only have a small fraction of color values that are out of gamut, the residual image will be dominated by zeros, and therefore will be highly compressible.

For cases where the adjust color values step 21 involves the application of a transform that modifies the color values for the colors within the limited color gamut as well as those outside the limited color gamut, a residual image determined by directly computing the difference between the input color values of the extended color gamut digital image 20 and the adjusted color values of the limited color gamut digital image 22 would have a large number of non-zero values. This could be undesirable for cases where the residual image is to be compressed. The prior example where the extended color gamut digital image 20 is a representation of the original scene, and the adjust color values step 21 includes rendering the color values to determine desirable color values for a target output device, will generally suffer from this problem. In this case, it can be desirable to apply a second rendering function to the extended color gamut digital image to determine a second set of rendered color values that are desirable for another output device having a larger color gamut than the first target output device. If the second rendering function were identical to the first rendering function throughout most of the color gamut, then a residual image computed by taking the difference between the first and second rendered images would again be largely dominated by zero differences. In one preferred embodiment of the present invention, the first rendering function produces a rendered image that is optimized for the particular hard-copy output medium, and the second rendering function produces a rendered image that is optimized for some hypothetical output device having an idealized large color gamut.

Once the residual image 26 has been calculated, an encode residual image on output print step 27 is applied. Generally, it will be desirable to apply a data compression technique to the residual image to reduce the amount of digital data that needs to be encoded on the limited color gamut output print. For example, the well-known JPEG compression technique could be used. Alternatively, a lossless compression technique could be used such as a run-length encoding method.

There are many different types of suitable digital encoding means. One example of a digital encoding means is to incorporate magnetic recording particles in an element on the surface of the hard-copy output medium. In this case, a digital record is made using a magnetic write head which writes digital information onto a magnetic layer on the print. The magnetic layer would typically be on either the front or rear surface of the print, or along the border of the print. If a magnetic layer were used on the front surface of the print, it would be desirable for the layer to be photographically transparent using means as exemplified in U.S. Pat. No. 5,229,259 which discloses a silver halide photographic material comprising both a silver halide emulsion layer as well as transparent magnetic recording layer.

Another example of a digital encoding means is to represent the bits of the residual image using a machine readable code that is substantially invisible. This can be accomplished using inks, pigments or dyes that absorb and/or fluoresce in the infrared or ultraviolet regions of the electromagnetic spectrum using means as exemplified in U.S. Pat. Nos. 5,542,971 and 5,514,860. U.S. Pat. No. 5,542,971 to Auslander et al. discloses bar codes using luminescent invisible inks and U.S. Pat. No. 5,514,860 to Berson discloses transparent materials imprinted with inks visible only in the infrared portion of the electromagnetic spectrum. The inks, pigments or dyes can be incorporated into the output medium, for example, as an additional layer in a silver halide photographic paper. Alternatively, the inks, pigments or dyes can be applied to the surface of the output medium using techniques such as ink jet printing.

Another example of a digital encoding means is to use a digital data embedding technique to embed digital data within a source image in a manner which is substantially invisible to a human observer. This is exemplified in U.S. Pat. No. 5,859,920 to Daly et al. which discloses a method comprising the following steps: a) generating a multi-level data image representing the digital data; b) convolving the multi-level data image with an encoding carrier image to produce a frequency dispersed data image; and c) adding the frequency dispersed image to the source image to produce a source image containing embedded data.

Yet another example of a digital encoding means is to use a visible modulation code on the rear surface of the limited color gamut output print. Examples of such modulation codes are the 2D symbologies marketed as Paperdisk™ by Cobblestone Software of Lexington, Mass. and DataGlyph™ by the Xerox Corporation of Stamford, Conn. respectively.

Another type of digital encoding means is to use a passive transponder. This approach is exemplified in the TIRIS Tag-It technology marketed by Texas Instruments Incorporated of Dallas, Tex.

An alternative to storing the full residual image data using the digital encoding means, is instead to store the residual image in a remote location, and then to store information about the location of the residual image on the output print using the digital encoding means. For example, the residual image could be stored on a network server, and the address of the stored residual image could be encoded on the output print using the digital encoding means. When it is desired to access the stored residual image, the information about the location of the residual image can be extracted from the output print, and the corresponding residual image can be accessed from the network server. This has the advantage that the amount of information that must be stored on the output print is reduced. Alternatively, the residual image could be stored in a central image data storage location, or using a transportable digital storage media such as a CDROM or a magnetic disk.

It will be obvious to one skilled in the art that there are many other types of digital encoding means which could be used consistent with the present invention.

Figure 3:
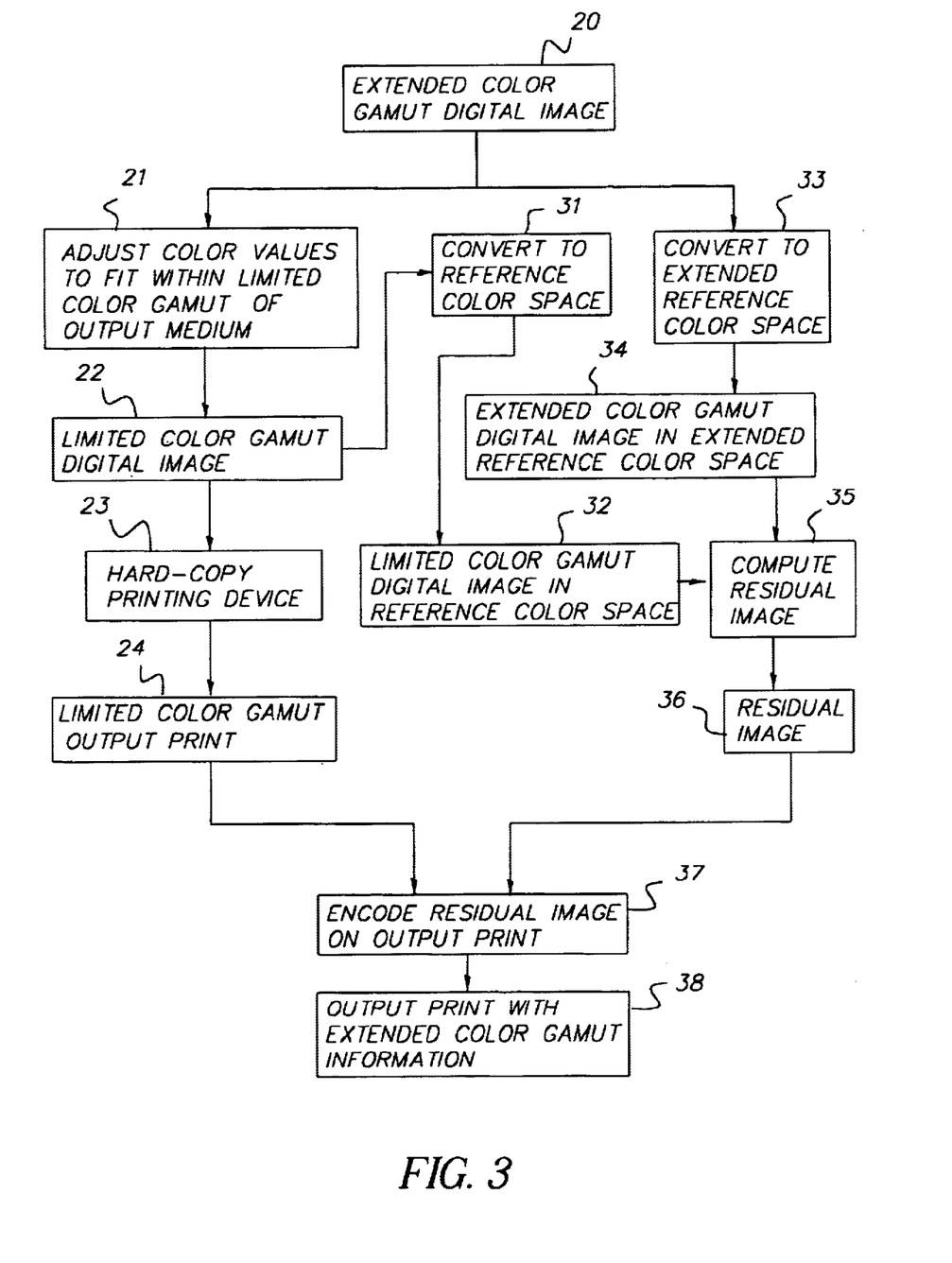
FIG. 3 is a flowchart showing a second process for making an output print with extended color gamut information in accordance with the present invention.

A second preferred embodiment of the present invention is shown in FIG. 3. This embodiment is similar to that shown in FIG. 2 but differs in the way that the residual image is determined. Where elements in this figure are common with those in FIG. 2, identical reference elements have been used. In this second embodiment, an extended color gamut digital image 20 has color values that are outside the limited color gamut of a particular output medium. An adjust color values step 21 is used to limit the color values to those that will fit within the limited color gamut of the particular output medium to form a limited color gamut digital image 22. Next, the limited color gamut digital image is input to a hard-copy printing device 23 to produce a limited color gamut output print 24. A convert to reference color space step 31 is then used to convert the limited color gamut digital image 22 to a reference color space forming a limited color gamut digital image in reference color space 32. The extended color gamut digital image 20 is converted to an extended version of the reference color space using a convert to extended reference color space step 33 forming an extended color gamut digital image in extended reference color space 34. Next a compute residual image step 35 is used to determine a residual image 36 representing the difference between the extended color gamut digital image in extended reference color space 33 and the limited color gamut digital image in reference color space 32. The residual image 36 is then encoded on the limited color gamut output print 24 using an encode residual image on output print step 37 to produce an output print with extended color gamut information 38.

Since most of the steps in this second embodiment of the invention are identical to the corresponding steps in the first embodiment, only the steps that differ will be discussed in more detail. The primary difference between the two embodiments is that the residual image is computed relative to a particular reference color space. Both the limited color gamut digital image 22 and the extended color gamut digital image 20 are converted to the same basic color space, although an extended version of the color space may be required to encode the extended color gamut digital image. Since the same basic color space is used in both cases, the residual image values for the in-gamut portions of the image will be substantially zero, and will therefore be highly compressible. The reference color space could be a device-independent color space such as the well-known CIELAB, or it could be any particular device-dependent color space.

The result of applying the method of the present invention is the creation of both a limited color gamut output print and an associated residual image which can be used to form a reconstructed extended color gamut digital image. The information that normally would have been discarded when the limited color gamut output print was created has now been stored in the residual image and is available for use by systems that are enabled to utilize it.

Figure 4:
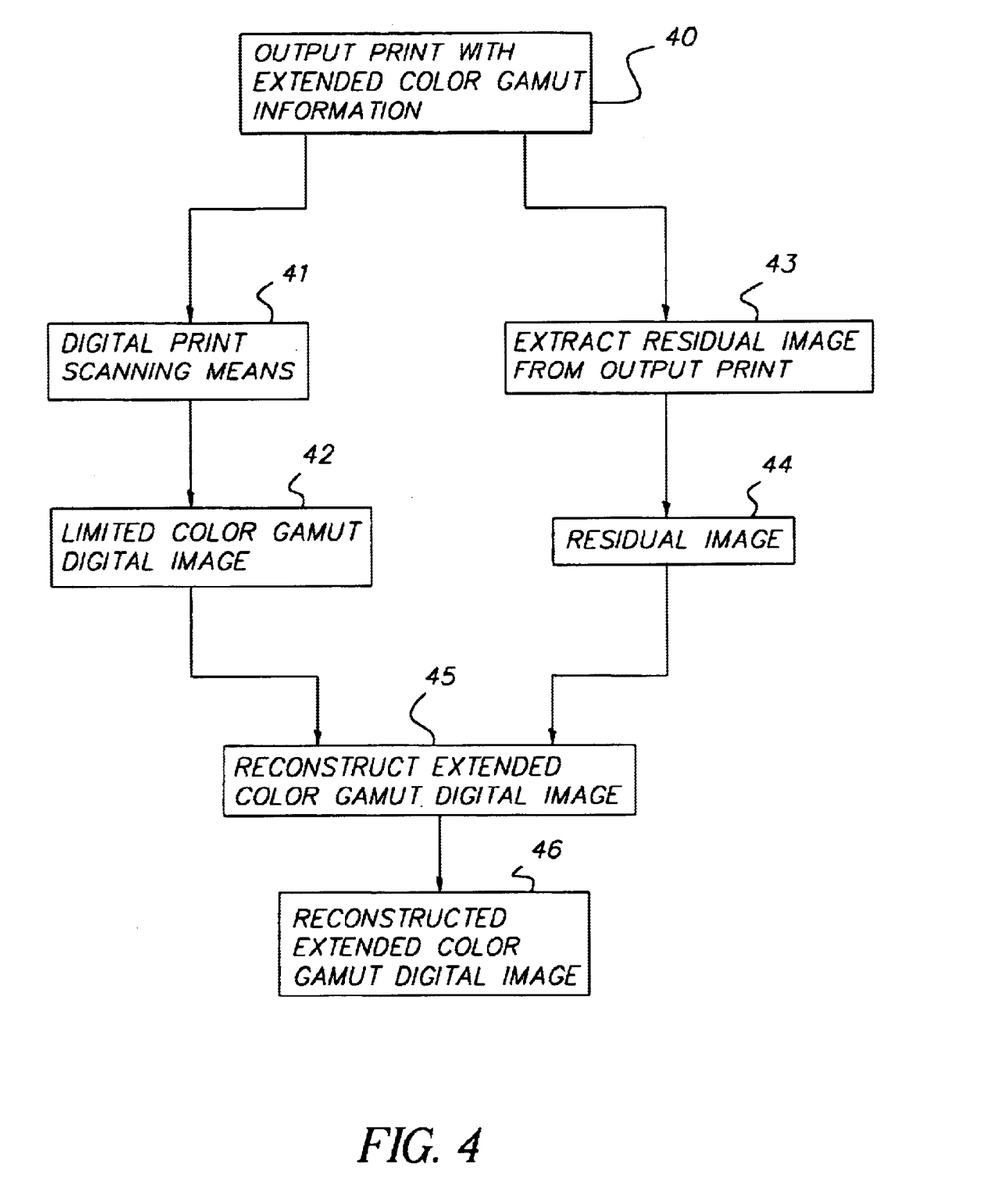
FIG. 4 is a flowchart showing the reconstruction of an extended gamut digital image from an output print with extended color gamut information.

FIG. 4 shows an example process that can be used to form a reconstructed extended color gamut digital image. The input to this process is an output print with extended color gamut information 40 created using the method as described above. A digital print scanning means 41 is used to scan the output print with extended color gamut information 40 to determine a limited color gamut digital image 42. An extract residual image from output print step 43 is used to recover the digitally encoded residual image from the output print. The details of this step will be dependent on the particular digital encoding means that was used to store the residual image. For example, if a magnetic recording element were used to store the residual image data, a magnetic playback means would be used to read the digital data. A reconstruct extended color gamut digital image step 45 is then used to form a reconstructed extended color gamut digital image 46 by combining the limited color gamut digital image 42 and the residual image 44. Typically, the reconstruct extended color gamut digital image step 45 will involve combining the limited color gamut digital image 42 and the residual image 44. If the limited color gamut digital image 42 determined by the digital print scanning means 41 is not in the same color space that was used when the residual image 44 was originally determined, then it will generally be necessary to convert the limited color gamut digital image 42 to this color space before it can be combined with the residual image 44.

The reconstructed extended color gamut digital image can be used for many different purposes. For example, it can be used to form a digital image appropriate for display on an output device having a color gamut different from the limited color gamut of the hard-copy output medium. This enables the generation of an optimal print from the original extended color gamut digital image, rather than a print limited by the constraints of the original output medium.

Alternatively, the information in the reconstructed extended color gamut digital image can be used during the process of applying a modification to the digital image. For example, consider the case where the original image is determined to be over-exposed. In this case, the highlights of the limited color gamut digital image would have been clipped during the adjust color values step. However, the highlight information would be restored in the reconstructed extended color gamut digital image. This information can then be used to produce a modified digital image that retains the highlight detail. Modifications to the digital image can be interactively specified by a user, such as in the case of a user adjustable lightness knob. Modifications can also be determined by applying an automatic algorithm to the digital image. For example, a "scene balance algorithm" can be used to estimate the best color balance and lightness level for an image.

A computer program product having a computer readable storage medium can have a computer program stored thereon for performing many of the steps of the present invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

This invention has been described in detail with particular reference to certain preferred embodiments thereof, but it will be understood that variations and modifications can be effected within the spirit and scope of the invention.

PARTS LIST 10 video RGB color gamut
12 reflection print color gamut
20 extended color gamut digital image
21 adjust color values
22 limited color gamut digital image
23 hard-copy printing device
24 limited color gamut output print
25 compute residual image
26 residual image
27 encode residual image
28 output print
31 convert to reference color space
32 limited color gamut digital image
33 convert to extended reference color space
34 extended color gamut digital image
35 compute residual image
36 residual image
37 encode residual image
38 output print
40 output print
41 digital print scanning means
42 limited color gamut digital image
43 extract residual image
44 residual image
45 reconstruct extended color gamut digital image
46 reconstructed extended color gamut digital image

What is claimed is:

1. A method for representing an extended color gamut digital image on a hard-copy output medium having a limited color gamut comprising the steps of:
   a) adjusting the color values of the extended color gamut digital image to fit within the limited color gamut of the output medium to form a limited color gamut digital image;
   b) producing a limited color gamut output print from the limited color gamut digital image on the hard-copy output medium;
   c) determining a residual image representing a difference between the extended color gamut digital image and the limited color gamut digital image; and
   d) encoding the residual image on the output print using a digital encoding means such that the residual image and the limited color gamut output print are adapted to be used to form a reconstructed extended color gamut digital image.

2. The method of claim 1 wherein the digital encoding means comprises a magnetic recording element on the hard-copy output medium.

3. The method of claim 1 wherein the digital encoding means comprises an invisible encoding means using an infrared absorbing ink, pigment or dye.

4. The method of claim 3 wherein the infrared absorbing ink, pigment or dye is incorporated into the hard-copy output medium.

5. The method of claim 3 wherein the infrared absorbing ink, pigment or dye is applied onto the hard-copy output medium.

6. The method of claim 1 wherein the digital encoding means comprises an invisible encoding means using an ultraviolet absorbing ink, pigment or dye.

7. The method of claim 6 wherein the ultraviolet absorbing ink, pigment or dye is incorporated into the hard-copy output medium.

8. The method of claim 6 wherein the ultraviolet absorbing ink, pigment or dye is applied onto the hard-copy output medium.

9. The method of claim 1 wherein the digital encoding means comprises an invisible encoding means using an infrared fluorescing ink, pigment or dye.

10. The method of claim 9 wherein the infrared fluorescing ink, pigment or dye is incorporated into the hard-copy output medium.

11. The method of claim 9 wherein the infrared fluorescing ink, pigment or dye is applied onto the hard-copy output medium.

12. The method of claim 1 wherein the digital encoding means comprises an invisible encoding means using an ultraviolet fluorescing ink, pigment or dye.

13. The method of claim 12 wherein the ultraviolet fluorescing ink, pigment or dye is incorporated into the hard-copy output medium.

14. The method of claim 12 wherein the ultraviolet fluorescing ink, pigment or dye is applied onto the hard-copy output medium.

15. The method of claim 1 wherein the digital encoding means comprises a visible modulation code on the rear surface of the hard-copy output medium.

16. The method of claim 1 wherein the digital encoding means comprises a digital data embedding technique.

17. The method of claim 1 wherein the digital encoding means includes a passive transponder.

18. The method of claim 1 wherein the limited color gamut digital image is determined by modifying color values that are outside the limited color gamut so that they are mapped to color values within the limited color gamut.

19. The method of claim 1 wherein the extended color gamut digital image has a larger range of chroma values than the limited color gamut digital image.

20. The method of claim 1 wherein the extended color gamut digital image has a larger luminance dynamic range than the limited color gamut digital image.

21. The method of claim 20 wherein the step of adjusting the color values of the extended color gamut digital image to determine the limited color gamut digital image includes applying a tone scale function to reduce the luminance dynamic range of the image.

22. The method of claim 1 wherein the extended color gamut digital image is a representation of the colors in an original scene.

23. The method of claim 22 wherein the limited color gamut digital image is determined by rendering the colors of the original scene to produce rendered color values that are desirable for the hard-copy output medium.

24. The method of claim 1 wherein a data compression technique is applied to the residual image before it is stored so that it can be represented by a smaller amount of digital data.

25. The method of claim 1 further including the step of using the residual image together with the limited color gamut output print to form a reconstructed extended color gamut digital image.

26. The method of claim 1 wherein the extended color gamut digital image originates from a scan of a photographic negative.

27. The method of claim 1 wherein the extended color gamut digital image originates from a scan of a photographic transparency.

28. The method of claim 1 wherein the extended color gamut digital image originates from a scan of a photographic print.

29. The method of claim 1 wherein the extended color gamut digital image originates from a digital camera.

30. The method of claim 1 wherein the residual image is determined by computing a difference between the extended color gamut digital image represented in an extended reference color space and the limited color gamut digital image represented in a reference color space.

31. The method of claim 30 including the step of recovering the digitally encoded residual image from output print.

32. The method of claim 1 further including the step of using the residual image together with the limited color gamut output print to form a digital image appropriate for display on an output device having a color gamut different that the limited color gamut of the original output medium.

33. The method of claim 32 wherein the limited color gamut output print is scanned using a digital print scanning means to determine a limited color gamut digital image.

34. A computer storage product having at least one computer storage medium having instructions stored therein causing one or more computers to perform the method of claim 1.

35. The method of claim 1 wherein the extended color gamut digital image is originally stored on a photographic element.

36. The method of claim 35 wherein the photographic element after a predetermined time period no longer contains the entire extended color gamut digital image but which has been stored on the output medium.

37. A method for representing an extended color gamut digital image on a hard-copy output medium having a limited color gamut comprising the steps of:

a) adjusting the color values of the extended color gamut digital image to fit within the limited color gamut of the output medium to form a limited color gamut digital image;

b) producing a limited color gamut output print from the limited color gamut digital image on the hard-copy output medium;

c) determining a residual image representing a difference between the extended color gamut digital image and the limited color gamut digital image such that the residual image and the limited color gamut output print are adapted to be used to form a reconstructed extended color gamut digital image;

d) storing the residual image using a digital storage means; and e) encoding information about the location of the stored residual image on the output print using a digital encoding means.

38. The method of claim 37 wherein the residual image is stored on a network server.

39. The method of claim 37 wherein the residual image is stored at an image data storage location.

40. The method of claim 37 wherein the residual image is stored on a transportable digital storage media.

41. A computer storage product having at least one computer storage medium having instructions stored therein causing one or more computers to perform the method of claim 37.

42. A method for representing and manipulating an extended color gamut digital image on a hard-copy output medium having a limited color gamut comprising the steps of:

a) adjusting the color values of the extended color gamut digital image to fit within the limited color gamut of the output medium to form a limited color gamut digital image;

b) producing a limited color gamut output print from the limited color gamut digital image on the hard-copy output medium;

c) determining a residual image representing a difference between the extended color gamut digital image and the limited color gamut digital image;

d) encoding the residual image on the output print using a digital encoding means such that the residual image and the limited color gamut output print are adapted to be used to form a reconstructed extended color gamut digital image;

e) specifying a desirable modification to the image; and f) using the residual image together with the limited color gamut output print and the specified desirable modification to the image to produce a modified digital image.

43. The method of claim 42 wherein the desirable modification is interactively user specified.

44. The method of claim 42 wherein the desirable modification is determined by applying an automatic algorithm to the digital image.

45. A computer storage product having at least one computer storage having instructions stored therein causing one or more computers to perform method of claim 42.

* * * * *